(12) United States Patent
Rabie et al.

(10) Patent No.: US 7,333,438 B1
(45) Date of Patent: Feb. 19, 2008

(54) PRIORITY AND POLICY BASED RECOVERY IN CONNECTION-ORIENTED COMMUNICATION NETWORKS

(75) Inventors: Sameh A. Rabie, Kanata (CA); Tong Shan, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1065 days.

(21) Appl. No.: 10/176,060

(22) Filed: Jun. 21, 2002

(51) Int. Cl.
H04L 12/26 (2006.01)

(52) U.S. Cl. ...................... 370/242; 370/216

(58) Field of Classification Search ............ None
See application file for complete search history.

(56) References Cited

U.S. PATENT DOCUMENTS

| | | | | |
|---|---|---|---|---|
| 5,590,118 | A | * | 12/1996 | Nederlof .................... 370/218 |
| 6,038,212 | A | * | 3/2000 | Galand et al. .............. 370/216 |
| 6,690,678 | B1 | * | 2/2004 | Basso et al. ................ 370/468 |
| 6,895,441 | B1 | * | 5/2005 | Shabtay et al. ............ 709/238 |
| 7,069,337 | B2 | * | 6/2006 | Rawlins et al. ............ 709/238 |
| 2001/0034853 | A1 | | 10/2001 | Takatama et al. ............ 714/4 |

FOREIGN PATENT DOCUMENTS

| | | |
|---|---|---|
| EP | 0 952 741 | 10/1999 |
| EP | 0 957 648 | 11/1999 |
| EP | 0 957 648 | 6/2000 |
| WO | WO 00/33606 | 6/2000 |

* cited by examiner

*Primary Examiner*—Huy D. Vu
*Assistant Examiner*—Toan Nguyen (57) ABSTRACT

A recovery method for use in a connection-oriented network having nodes interconnected by links for establishing connections within the network, the method described enables the recovery of connections in the network in the event of a failure. The recovery method includes the following steps: (a) assigning connection re-routing priority to the connections in the network based on configured polices in response to the failure; and (b) creating release message bundles based on the assigned connection re-routing priority for use by the nodes in the network to recover connections. More specifically, a failure (e.g., link failure) could affect hundreds or thousands of connections passing through a node. To recover these connections, the node determines which connections should be recovered first and which connections can wait (or may never be recovered). The recovery method determines the priorities of re-routing connections after failure. After the re-routing priorities are determined for connections, the present invention provides mechanisms for bundling release messages and pacing the messages using hold-off timers to maximize the recovery of connections based on various network configurations and implementations.

37 Claims, 8 Drawing Sheets

PRIORITY AND POLICY BASED RECOVERY IN CONNECTION-ORIENTED COMMUNICATION NETWORKS

FIELD OF THE INVENTION

The present invention relates generally to recovery methods in connection-oriented, and more particularly to priority and policy based recovery methods in connection-oriented networks (circuit or packet switched) in the event of a failure such as link failure.

BACKGROUND OF THE INVENTION

To provide a proper basis of terminology the following standards are used:
(a) Application and service are used synonymously to refer to, for example: Asynchronous Transfer Mode (ATM); Frame Relay (FR); Multiprotocol Label Switching (MPLS); and Internet Protocol (IP).
(b) A link refers to a physical connection (e.g., a copper wire, microwave link, optical fiber cable, etc.) and virtual connections (e.g. an ATM Virtual Path or Virtual Connection, an MPLS tunnel, an optical light path etc.).
(c) A tunnel refers to an aggregate/transport Label Switched Paths (LSPs) in MPLS networks.
(d) Nodes are classified into access/edge nodes, re-routing/core nodes, and backbone nodes depending on the role they play in setting up the connection. The access/edge node originates the connections and performs route computation and network level connection admission control functions. The re-routing node performs similar functions as the access node after a failure notification and when connection re-routing is required. The access and re-rerouting nodes are usually the same in simple flat networks, but may be different in hierarchical or multi-domain networks or when fast re-routing methods are employed. The backbone node performs nodal connection admission control and resource allocation functions on connection setup and sends a connection release message to the re-routing node upon failure detection. In practice, the same node may play all the above roles for different connections. For simplicity, the terms access nodes, edge node and re-routing node are used synonymously throughout.
(e) IP/MPLS Quality of Service (QoS) classes used in the present application include: Expedited Forwarding (EF); Assured Forwarding levels (AF4, AF3, AF2, AFT); and Best Effort (BE).
(f) ATM Quality of Service (QoS) classes used in the present application include: Constant Bit Rate (CBR); Real-Time Variable Bit Rate (VBR-rt); Non-Real-Time Variable Bit Rate (VBR-nrt); and Unspecified Bit Rate (UBR).

The ATM domain-based re-routing standard describes procedures for re-routing permanent and switched connections at the network/domain edge upon failures. In current ATM networks, upon link failure, all connections have the same priority for re-routing. Therefore, release messages are sent randomly without particular sequence considerations. MPLS networks employ similar methods. In particular, upon link failure MPLS release/failure messages are sent by the core node (termed Label Switch Routers) to the access node (termed Label Edge Routers) or to a node closer to the failure (including the node detecting the failure) for employing one of the re-routing/local repair methods.

Recently, the ATM Forum has proposed to optionally signal the call processing priority when connection is first established. This will enable a service provider to give preferential access to call processing resources for higher priority connections, which takes place during connection setup, clearing and re-routing time. Similarly, the current IETF MPLS standard drafts provide methods for optional signaling of connections set-up and holding priorities, which could be used to provide preferential access to network resources in case of congestion or failure.

However, there is a need for recovery methods that (a) can be policy driven to determine connection re-routing priority in networks where call processing priority is not signaled; (b) can modify the re-routing priority on the basis of configured policies; (c) can modify the re-routing priority adaptively on the basis of dynamic network conditions and/or (d) can schedule or pace the release messages to ensure that priority connections have first access to available network resources and optimal route selection.

SUMMARY OF THE INVENTION

Exemplary embodiments of the present invention provide methods and mechanisms to recover connections after failure within a connection-oriented network (e.g., ATM, MPLS, etc.) in a priority manner to optimize overall network QoS, link efficiency, fairness and the like. Particular embodiments of the present invention provide policy-based methods for determining connection re-routing priority where call processing priority is not signaled. Further particular embodiments provide methods of modifying re-routing priority based on network configured policies and dynamic network conditions. Also, in an exemplary embodiment, scheduling or pacing of release messages is described to ensure that priority connections have first access to available network resources.

In accordance with one aspect of the present invention there is provided a method for use in a connection-oriented network comprising a plurality of nodes interconnected by a plurality of links for establishing connections within the network, the method enabling the recovery of connections in the network in the event of a failure therein, the method comprising: (a) assigning connection re-routing priority to the connections in the network based on configured polices in response to the failure; and (b) creating release message bundles based on the assigned connection re-routing priority for use by the nodes in the network to recover connections.

In accordance with another aspect of the present invention there is provided an apparatus for use in a connection-oriented network comprising a plurality of nodes interconnected by a plurality of links for establishing connections within the network, the method enabling recovery of connections in the network in the event of a failure therein, the apparatus comprising: (a) a mechanism configured and adapted to assign connection re-routing priority to the connections in the network based on configured polices in response to the failure; and (b) a mechanism configured and adapted to create release message bundles based on the assigned connection re-routing priority for use by the nodes in the network for recovering connections.

In accordance with another aspect of the present invention there is provided a computer program product for use in a connection-oriented network comprising a plurality of nodes interconnected by a plurality of links for establishing connections within the network to enable recovery of connections in the network in the event of a failure therein, the computer program product comprising computer readable program code devices for: (a) assigning connection re-routing priority to the connections in the network based on configured polices in response to the failure; and (b) creating release message bundles based on the assigned connection re-routing priority for use by the nodes in the network to recover connections.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Further features and advantages of the present invention will be described in the detailed description, taken in combination with the appended drawings, in which.

DETAILED DESCRIPTION OF EMBODIMENTS OF THE PRESENT INVENTION

Figure 1:
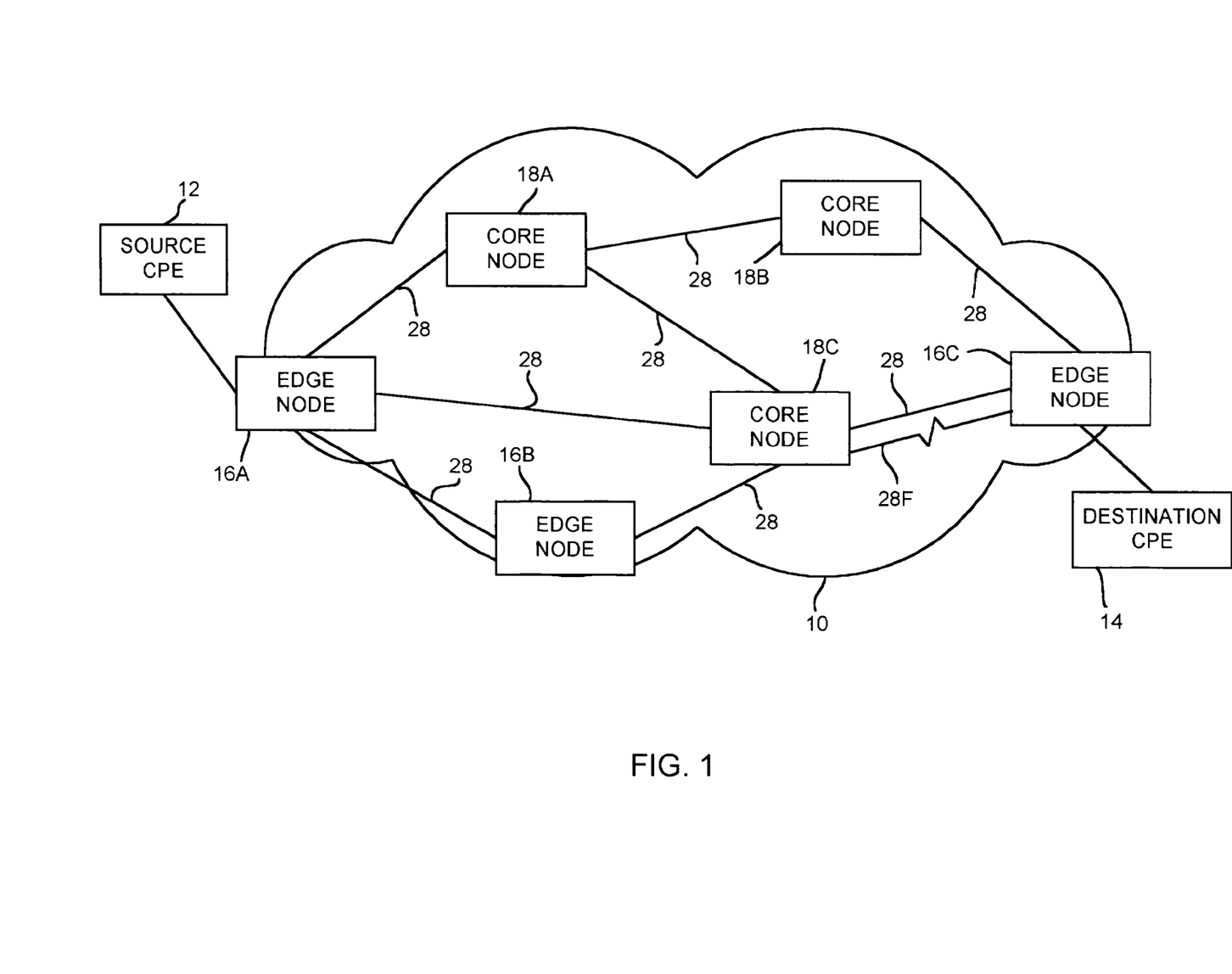
FIG. 1 illustrates a simplified topology of a connection-oriented network supporting the recovery procedures according to the present invention.

FIG. 1 illustrates components of a connection-oriented network 10 to illustrate various recovery procedures according to the present invention. In general, the network 10 consists of a set of switching/nodes interconnected by links. The network 10 carries user traffic using switched, permanent, or semi-permanent connections.

More specifically, the network 10 is used (as an example only) to establish a call between a source customer premise equipment (CPE) 12 and a destination CPE 14. The source CPE 12 originates a connection (e.g. ATM, FR, MPLS etc.) with the network 10 at an edge node 16A (also termed an originator) to another edge node 16C (termed the terminator) to establish a call connect to the destination CPE 14 through another edge node 16B and a series of core nodes 18A-C. Note in this example, the edge node 16B is a dual edge/core node, which is acting as a core node for this connection. Traffic through the network 10 is over a series of routing links 28. Each link 28 is basically a communications channel or circuit. For example, in an ATM environment a link is an entity that defines a topological relationship between two nodes. In practice, many connections can be established in the network 10 between CPE 12 and CPE 14 and, for example, between a CPE connected to edge node 16B and a CPE connected to edge node 16C.

Each of the edge nodes 16A-C and core nodes 18A-C includes a connection admission control (CAC) component. The CAC component is defined as a set of actions taken by the network 10 during a call setup (or call re-negotiation) phase (i.e. establishing a connection between the source CPE 12 and the destination CPE 14). The set of actions determine the path through the network and whether a connection request (made by the CPE 12) can be accepted or should be rejected (or whether a request for re-allocation can be accomplished).

As is well known in the art, the CAC component receives a number of input parameters to process a connection request (made by the source CPE 12) as follows:
  (a) a route selection process using either on-demand computation, pre-established backup routes or pre-emption of lower-priority connections;
  (b) a traffic descriptor (e.g., in ATM: Peak Cell Rate (PCR); Sustainable Cell Rate (SCR); Maximum Burst Size (MBS); etc., and in IP/MPLS: constraint-routing label distribution protocol (CR-LDP), which specifies PDR (Peak Data Rate), CDR (Committed Data Rate) and CBS (Committed Burst Size) or equivalent traffic parameters if the RSVP-TE protocol is used);
  (c) link capacity represents total bandwidth available for connections use;
  (d) allocated capacity represents total reserved bandwidth by all connections using the link; and
  (e) quality of service requirements (e.g., IP/MPLS Quality of Service (QoS): Expedited Forwarding (EF); Assured Forwarding levels (AF4, AF3, AF2, AF41); and Best Effort (BE); and ATM Quality of Service (QoS): Constant Bit Rate (CBR); Real-Time Variable Bit Rate (VBR-rt); Non-Real-Time Variable Bit Rate (VBR-nrt); and Unspecified Bit Rate (UBR).

The input parameters are processed by the CAC component for route selection and to determine whether a connection request (made by the CPE 12) can be accepted or should be rejected.

On failure in the network 10, for example at core node 18C, due to a link failure (illustrated in FIG. 1 as link failure connect 28F), release messages are sent to the edge nodes 16A and 16B. The edge nodes 16A and 16B attempt to re-route the failed connections either by calculating new routes with enough capacity/QoS (by using a pre-established backup path, if available) or if supported and necessary by preempting lower-priority connections. The present invention describes recovery methods that deal with the priority/order and pacing of the release messages, which make an impact on network QoS objectives and on maximizing network efficiency.

As a simplified ATM based example, core node 18C should prioritize the sending of release messages to edge node 16A (e.g., send the ATM release messages for CBR before VBR connections). Edge node 16A will typically process release messages in the order of arrival. Sending CBR messages first will ensure fast recovery time, optimal route selection and bandwidth availability for the CBR connections. However, sending release messages in priority order may not be sufficient to ensure priority re-routing. In particular, release messages destined to nearby edge node 16B may arrive faster than those destined to edge node 16A. The arrival time variance could result in faster re-routing (and use of limited network bandwidth) by lower-priority connections re-routed at edge node 16B over high-priority connections re-routed at edge node 16A. The recovery methods of the present invention also support a pacing procedure for the release messages, depending on network topology, nodal processing capabilities, and other factors, to ensure that priority connections are re-routed first regardless of the re-route originating node.

The recovery methods and mechanisms of the present invention are discussed in the context of ATM based networks using ATM service categories (CBR, VBR, etc.), P-NNI routing/re-routing, call processing priorities and the like. However, it is understood that the recovery methods and mechanisms described can also be applied to any connection-oriented network. In particular, the network may be packet or circuit switched such as networks using IP/MPLS protocols or to TDM/optical networks (e.g., based on Automatic Transport Switched Networks—ATSN).

As an example, the recovery methods and mechanisms of the present invention can be mapped to MPLS networks as follows: MPLS can use RSVP-TE service categories (e.g., controlled load or guaranteed service), CR-LDP QoS, or DiffServ classes (e.g., EF, AF, CS, etc.). MPLS typically uses the OSPF-TE (Open Shortest Path First-Traffic Engineering) or IS-IS (Intermediate System-Intermediate System)-TE routing protocols, which provide equivalent functionality to ATM P-NNI. The IP routing protocols OSPF-TE/IS-IS-TE allow the optional signaling of connections class-type and pre-emption priority.

An output link failure (e.g., 28F) at a network node (e.g., 18C) could affect hundreds or thousands of connections passing through it. For example, the link 28F may support 1000 CBR VCCs, 4000 VBR VCCs and 10,000 UBR VCCs. To recover these connections, the network node (e.g., 18C) determines: (a) connections that should be recovered first; (b) connections that can wait for recovery; and (c) connections that may not be recovered. The present invention proposes methods for determining the priorities of re-routing the connections after failure.

More particularly, in networks where connection setup/re-routing priority is not signaled (such as in current ATM implementations), the present invention proposes methods for determining connection re-route priority based on pre-configured policies and/or on the dynamic network conditions. In networks where connection setup/re-routing priority is signaled (such as in new ATM forum based implementations as discussed above), the present invention proposes methods for adjusting connection priority based on configured policies and adaptively modifying the priority based on dynamic network conditions.

After re-routing priorities are determined (details described in conjunction with FIG. 2) for connections, the relevant node schedules the sending of release/notification messages to the connections' source nodes. The present invention proposes methods of scheduling the sending of release messages on the basis of network operation selected criteria. The following mechanisms will be discussed: (a) grouping the release messages together in bundles, which have similar recovery requirements, such that the messages within a bundle can be sent in succession without waiting; and (b) using hold-off/delay timers for pacing the release messages between bundles.

Figure 2:
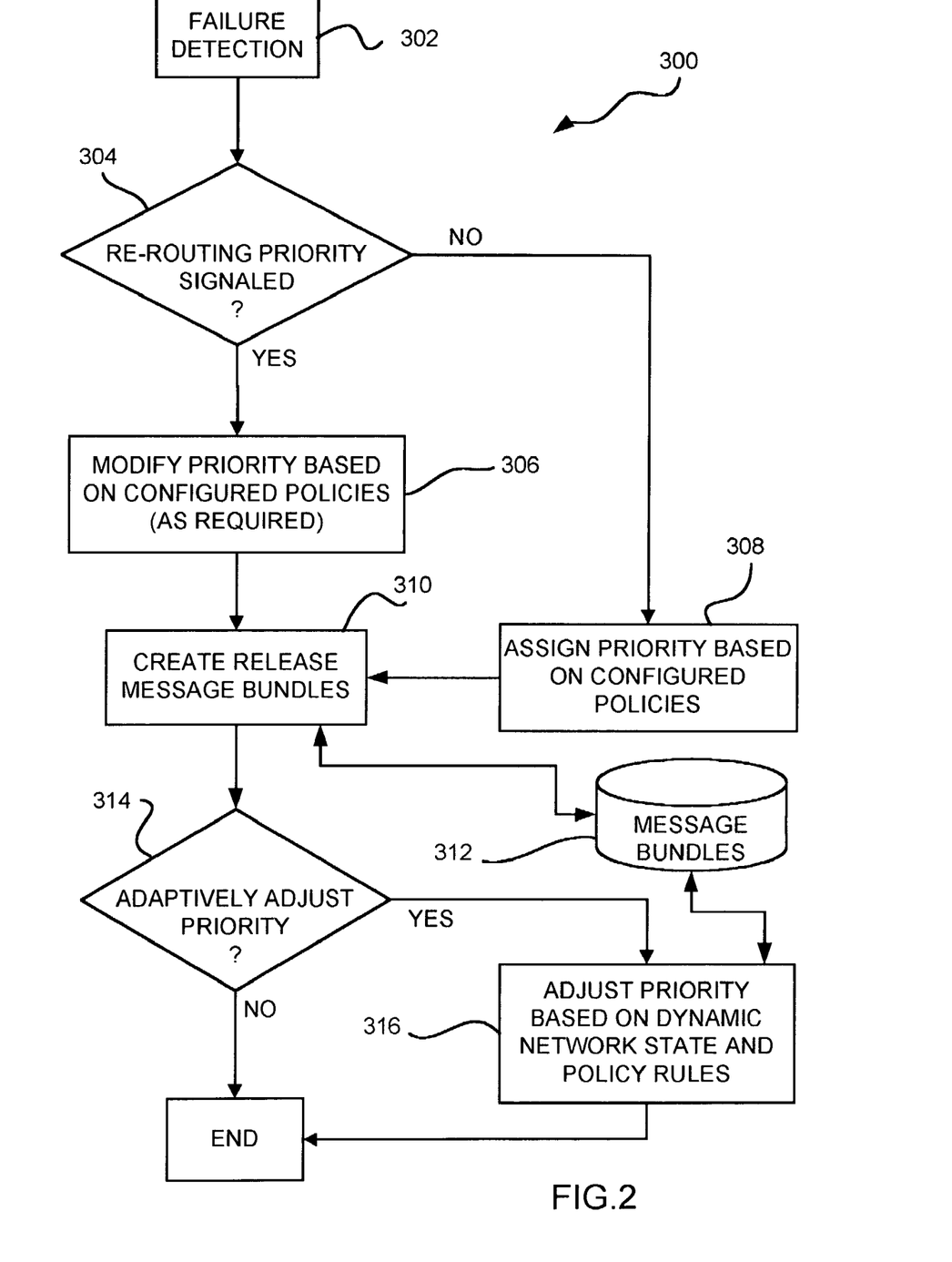
FIG. 2 illustrates a flow chart for determining re-routing priorities according to an embodiment of the present invention.

Referring to FIG. 2, a method 300 of determining re-routing priorities according to an embodiment of the present invention is illustrated. The method 300 starts at step 302 when failure is detected in the network 10. Failure is detected using known switch alarm systems and network management functionalities (triggered by loss of an optical or electrical signal, timeout of a "hello" acknowledgement from a nearby node, etc.). Failure is defined generally to include link failure, line card port failure, line card processor failure, system or firmware failure, etc. Also, a node failure can be treated as multiple link failures, which will be detected and reported by its neighboring nodes.

If re-routing priority is signaled at step 304 then processing continues to step 306 where priorities can be modified based on configured policies. For example, when a node receives a PNNI (Private Network-Network Interface) message, in which a re-routing priority field appears, the node is made aware that a re-routing priority is signaled.

Figure 4:
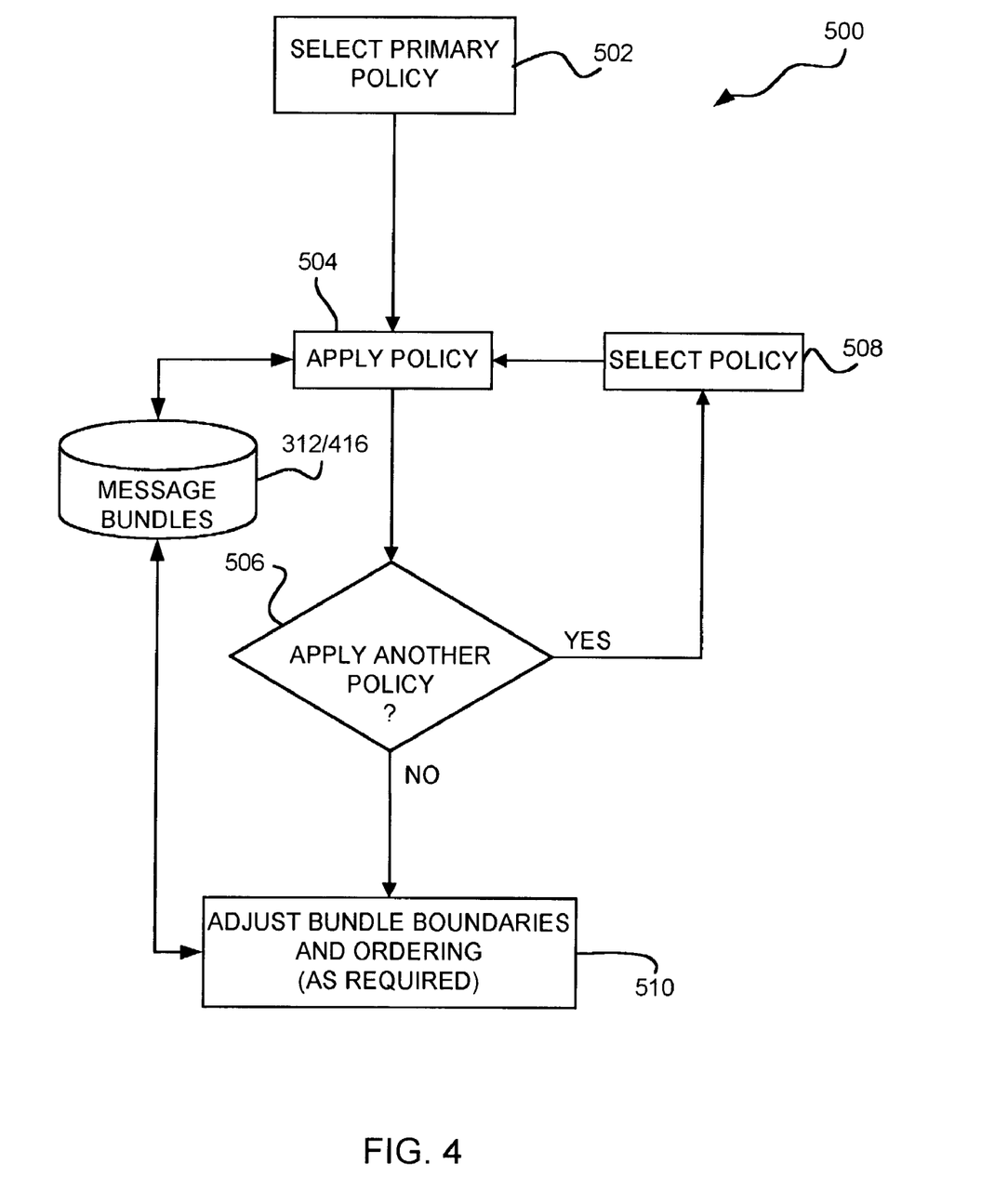
FIG. 4 illustrates a flow chart of a priority assigning procedure when multiple policies are applied according to an embodiment of the present invention.

A method of applying multiple policies in modifying the priorities from step 306 is discussed in conjunction with FIG. 4. If re-routing priority is not signaled at step 304 then processing continues to step 308 where priorities are assigned based on configured policies (also discussed in detail in conjunction with FIG. 4). After connections are assigned re-routing priorities (from step 306 or 308), release message bundles are created at step 310 and stored in a data storage medium 312 (such as a database, memory, etc.). A bundle is a collection of release messages having a similar recovery requirement and is discussed in more detail below.

After creation of the release message bundles at step 310 processing continues to step 314 where it is determined if the priorities are to be adaptively adjusted. Adaptive adjustment is determined from the nodal configuration regarding whether adaptive policies are used in deciding re-routing priority. If adaptive adjustment is required processing continues to step 316 where re-routing priorities are adjusted based on the dynamic network state and adaptive policies and adjusts the release message bundles 312 accordingly. The adjustment step 316 is discussed in more detail below. If adaptive adjustment is not required as determined at step 314 then the method 300 is complete.

Figure 3:
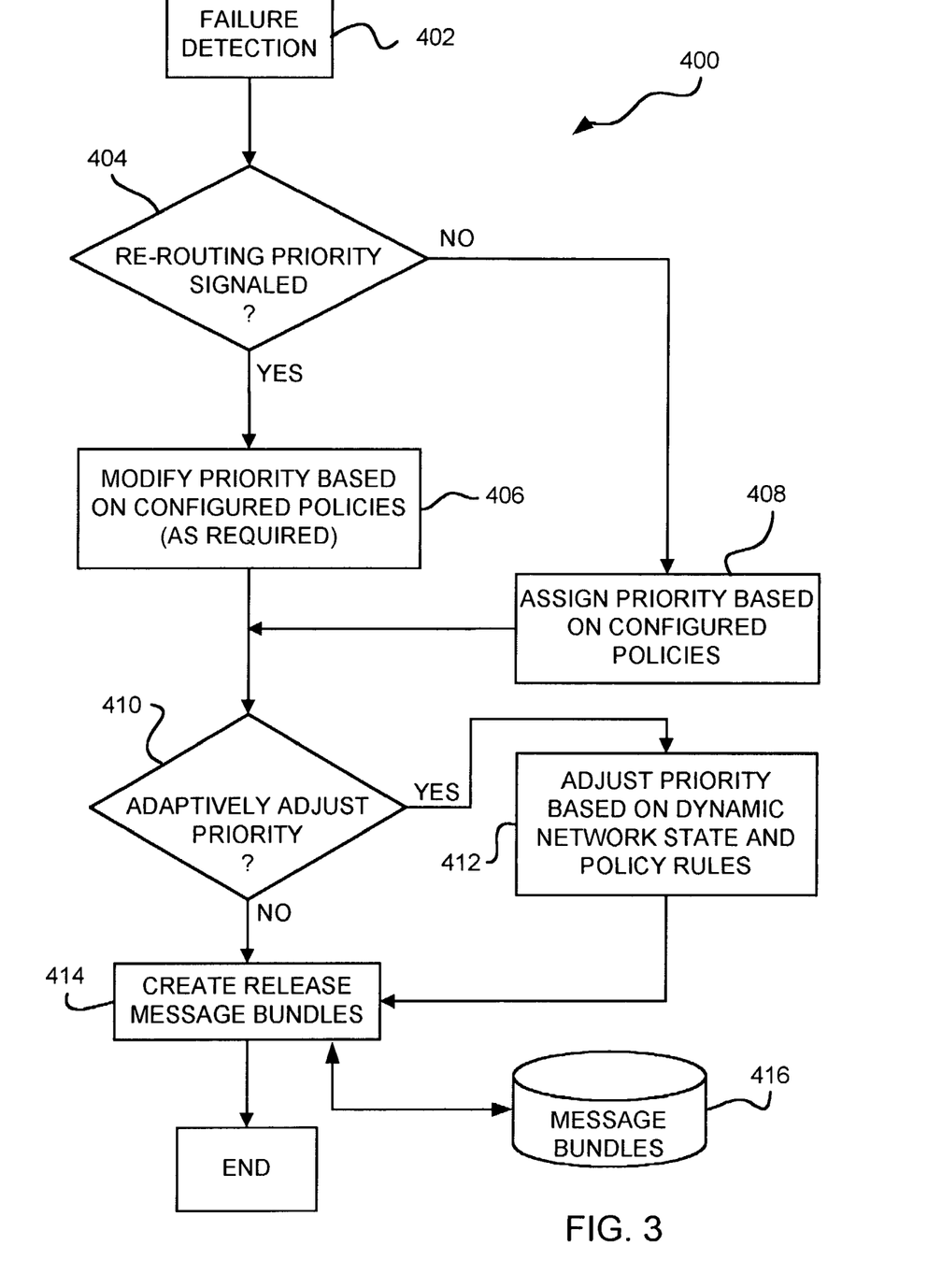
FIG. 3 illustrates a flow chart for determining re-routing priorities according to another embodiment of the present invention.

FIG. 3 illustrates a method 400 of determining re-routing priorities according to another embodiment of the present invention. The functionality of the method 400 is similar to that of method 300. The differences relate to implementation. For example, in method 400, connection priorities are assigned/modified using adaptive policy rules before creating the release message bundles unlike method 300 where connection priority can be adaptively adjusted after creation of the release message bundles.

More specifically, the method 400 starts at step 402 when failure (as discussed above) is detected in the network 10. If re-routing priority is signaled at step 404 then processing continues to step 406 where priorities can be modified based on configured policies. A method of applying multiple policies in modifying the priorities from step 406 is discussed in conjunction with FIG. 4. If re-routing priority is not signaled at step 404 then processing continues to step 408 where priorities are assigned based on configured policies (also discussed in detail in conjunction with FIG. 4).

After assigning the priorities at step 408 processing continues to step 410 where it is determined if the priorities are to be adaptively adjusted. If adaptive adjustment is required then processing continues to step 412 where re-routing priorities are adjusted based on the dynamic network state and policy rules and creates release message bundles at step 414, which are stored in a data storage medium 416. If adaptive adjustment is not required, as determined at step 410, processing proceeds directly to the creation of the release message bundles step 414.

Message bundling (as recited in steps 310 and 414) represents a managed trade-off between recovery speed and priority based recovery. In particular, a bundle is a collection of release messages with similar recovery requirements. Therefore, messages within a bundle can be sent in rapid succession without significant wait between the individual messages. A hold-off timer can be used to separate the sending of release messages of different bundles as required for a given network environment. In particular, after sending release messages of one bundle, a releasing node would wait for the hold-off timer expiry before beginning to send the release messages of the next bundle. Details of a message release mechanism according to the present invention are described in conjunction with FIG. 5.

FIG. 4 illustrates a method 500 of applying multiple policies iteratively in assigning re-routing priority according to an embodiment of the present invention. The method 500 is a representative example of a process that can be used in steps 306, 308 and 316 of FIG. 2. The method 500 includes the following characteristics: (a) can be used when multiple configured or adaptive policies are applied; (b) can be used with hierarchical application of policies with critical policies being applied first; and (c) allows for optional deviation from the hierarchical policies using user-specified heuristics.

The method 500 begins by selecting a primary policy at step 502. An example of a primary policy is to re-route CBR connections before VBR connections. The selected primary policy 502 is applied at step 504 with access to the message bundle data storage 312/416. After applying the primary policy, a CBR release message bundle and a VBR release message bundle would be stored in the data storage 312/416. If another policy is to be applied, as determined at step 506, then processing continues to step 508 to select another policy. An example of another policy that may be selected at step 508 is a secondary policy such as PVCs connections before SVCs connections. After applying the selected secondary policy (for the PVC/SVC example) the following bundles would be stored in the data storage 312/416: (a) CBR PVC; (b) CBR SVC; (c) VBR PVC; and (d) VBR SVC.

If another policy is not to be applied, as determined at step 506, then processing continues to step 510 where the bundle boundaries and ordering can be adjusted. If another re-routing policy (e.g., larger connections before small connections) is to be applied on top of the bundles established above (CBR PVC, etc.) then the bundles are revised to: (a) large CBR PVC, (b) small CBR PVC, (c) large CBR SVC, (d) small CBR SVC, (e) large VBR PVC, (f) small VBR PVC, (g) large VBR SVC, and (h) small VBR SVC. If no policy is to be applied (determined at step 506) after this bundling then the bundling order can be adjusted by moving large VBR PVC re-routing priority higher than small CBR PVC. Also, the bundling boundaries can be adjusted by bundling (f), (g) and (h) together.

Figure 5:
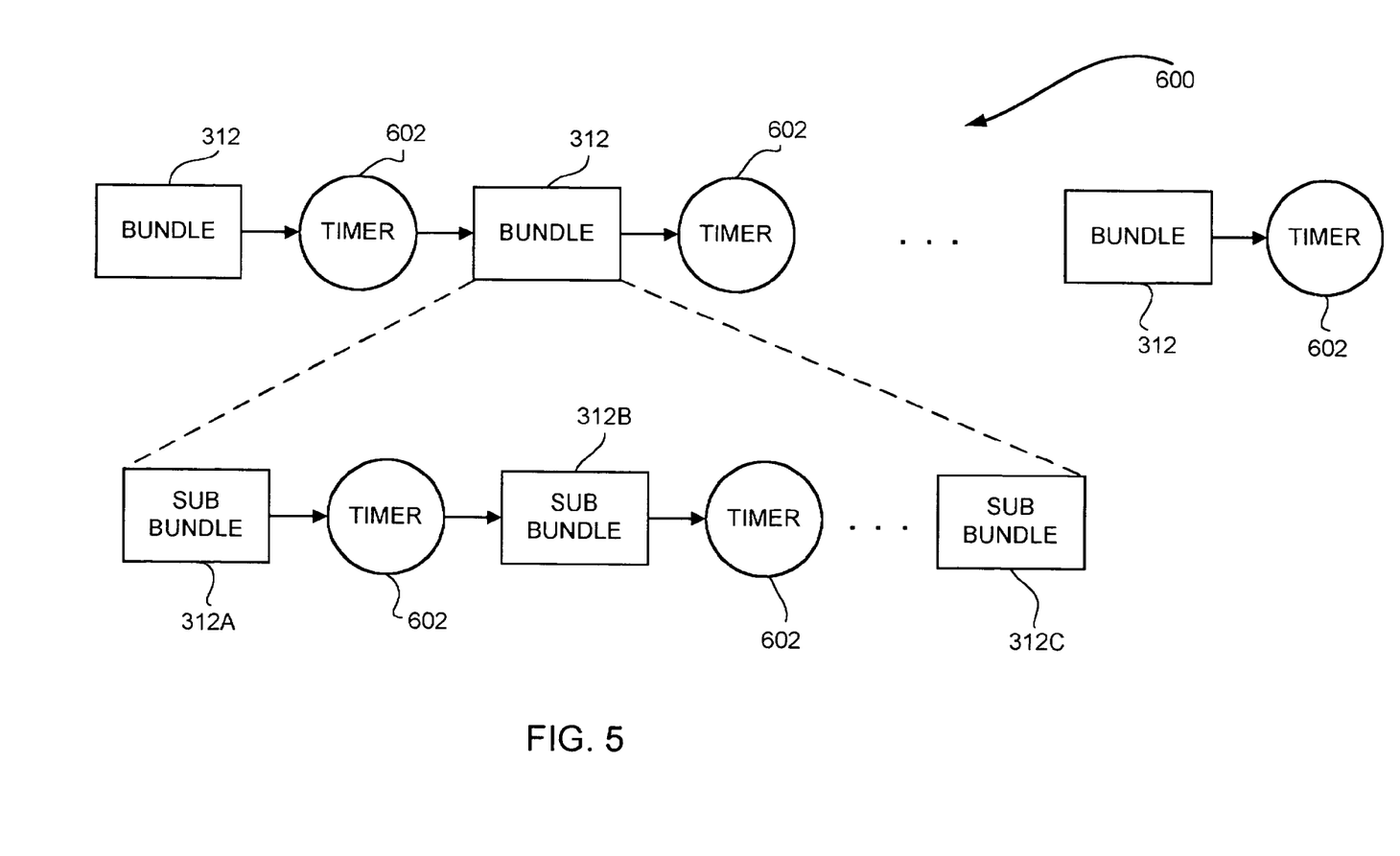
FIG. 5 illustrates a schematic representation of a message release mechanism according to an embodiment of the present invention.

FIG. 5 illustrates a schematic representation of a message release mechanism 600 according to an embodiment of the present invention. Messages within a bundle 312 are released quickly with limited (if any) delay. Hold-off timers 602 are used between bundles 312.

In an alternative technique according to the present invention, bundles 312 can be managed in a hierarchical manner. In particular, a bundle (e.g., 312) may be sub-divided into sub-bundles 312A-C using a secondary priority classification. For example, two main bundles 312 are defined using CBR and VBR with a further classification of the CBR connections into "large" and "small" connection sub-bundles 312A and 312B.

The hold-off timer 602 value (delay time) is dependent on at least one of the following factors:

(a) whether a node releasing the messages is a core or access node;
(b) propagation and signal processing delays, which are general network parameters: avg/worst case vs. customized for each access node;
(c) whether network implements pre-emption or back-up connections; and
(d) objectives and trade-offs (i.e., speed of recovery/QoS, bandwidth efficiency, class differentiation, revenue, etc.)

In particular, for item (a), if the node generating the release message is a core node, the release message will take time to travel to the access node, where re-routing would take place. This time should be factored when calculating the hold-off timer value to ensure that a bundle of release messages are acted upon before sending the next bundle of release messages. In contrast, if the node sending the release message is the same node performing the re-routing function, no such delay is encountered, and therefore, a much smaller hold-off timer is required.

The hold-off timer may still need to have some finite value to allow for different processing delays within the node, especially if the node employs a parallel (versus centralized) connection processing method. For example, the hold-off timer value can be set to the value determined by EQ. (1) (described below) independent of the node releasing the message. If the node sending the releasing message is an access node then for those connections whose originated node is the access node, the hold-off timer controls when to start re-routing, instead of the time to send the releasing message.

In particular, for item (b), the network 10 may employ a user-configured value for propagation and call processing delay, which would reflect the network topology and diameter, and user policy. Alternatively, more elaborate schemes may be used where different values are used for each core-access node pair. These values may be user-configured or, if available, extracted/inferred from a topology database.

In particular, for item (c), if backup connections are implemented in the network 10, the hold-off timer value can be much smaller than that when backup connections do not exist, because the priority connections are guaranteed to be rerouted on pre-engineering QoS back-up connections. If pre-emption is supported, the hold-off timer value can be smaller than that when pre-emption is not supported because later arriving priority connections would still be established by pre-empting lower priority ones.

In particular, for item (d), prioritizing recovery of connections has advantages, depending on the policies used in the prioritizing. For example, to guarantee QoS for higher service class connections, improve bandwidth efficiency, increase revenue, etc. After re-route priorities are assigned, hold-off timer is used to pace the sending of the releasing messages.

The objective of using the hold-off timer is for fast recovery of connections of higher re-route priority ensuring them having the first access of available resources and optimal route selection. However, this scheme results in slower recovery and degraded QoS of connections given lower re-route priority.

The hold-off timers 602 are used to pace the sending of release messages to connections' source nodes so that release messages of some connections are sent some prescribed period of time before other connections. Pacing in this manner enables control over the re-routing of connections and lets higher priority connections have preferential access to the resources and better routes when setting up backup connections.

Examples of factors that can impact the hold-off timer value include:

(a) propagation delay between the current node and the source node of the connection "i" ($t_{prop,i}$);
(b) processing time of the release message at the source node of the connection "i" ($t_{proc,i}$); and
(c) re-routing time at the source node of connection "i" ($t_{rout,i}$).

The current node is defined as the node detecting the failure and sending the releasing message to the originating nodes of affected connections. The source node is defined as the originating edge node of a connection.

The hold-off timer value for a group of connections (say N connections in the group) is defined as:

$$\max\{(t_{prop,i}) + (t_{proc,i}) + (t_{rout,i})\} \text{ for all connections } 1 \le i \le N \text{ in a group.} \quad \text{EQ. (1)}$$

Figure 6:
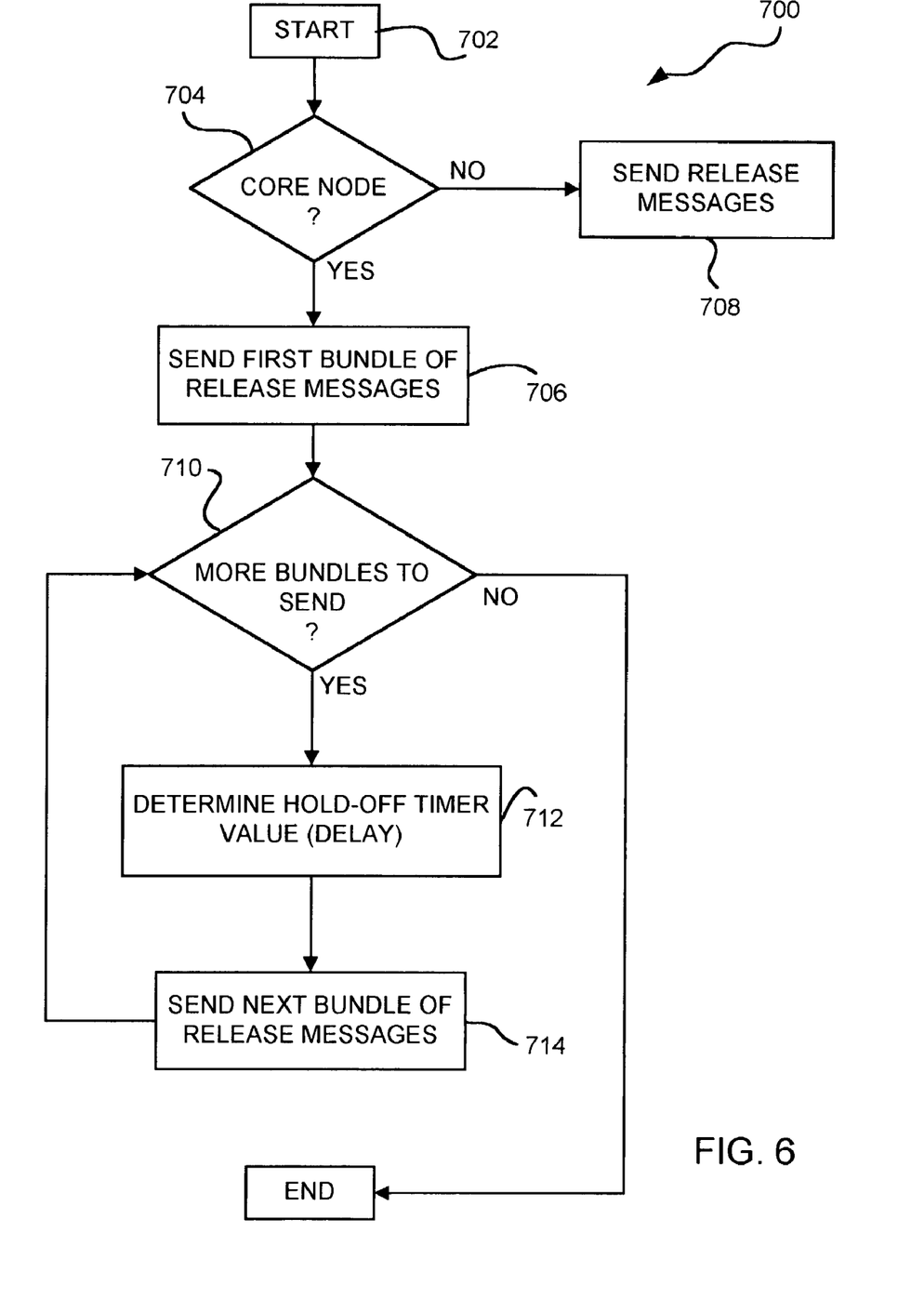
FIG. 6 illustrates a flow chart of a release message pacing method according to an embodiment of the present invention.

FIG. 6 illustrates a pacing method 700 for pacing release messages in a plurality of bundles according to an embodiment of the present invention. The pacing method 700 begins at start step 702 when the message release mechanism 600 begins to initiate the transmission of release messages. If the node (i.e., the node of interest) is a core node (e.g., 18A-C), as determined at step 704, then the first bundle of release messages (as created at step 310 of FIG. 2 or at step 414 of FIG. 3) is sent at step 706. If the node is not a core node (i.e., an edge/access node 16A-C), as determined at step 704, then all the release messages in all the bundles (e.g., 312 of FIG. 5) are sent at step 708. There will be limited effective propagation delay when the node that detects failure is the same node that performs re-routing.

If after sending the first bundle of release messages at step 706 there are more bundles to be sent, as determined at step 710, then a hold-off timer value (or delay value) is determined at step 712 and the next bundle of messages is sent at step 714 after the expiry of the value of the hold-off timer. An example of the details of step 712 is described in FIG. 7. If no more bundles are to be sent, as determined at step 710, then processing is complete.

Figure 7:
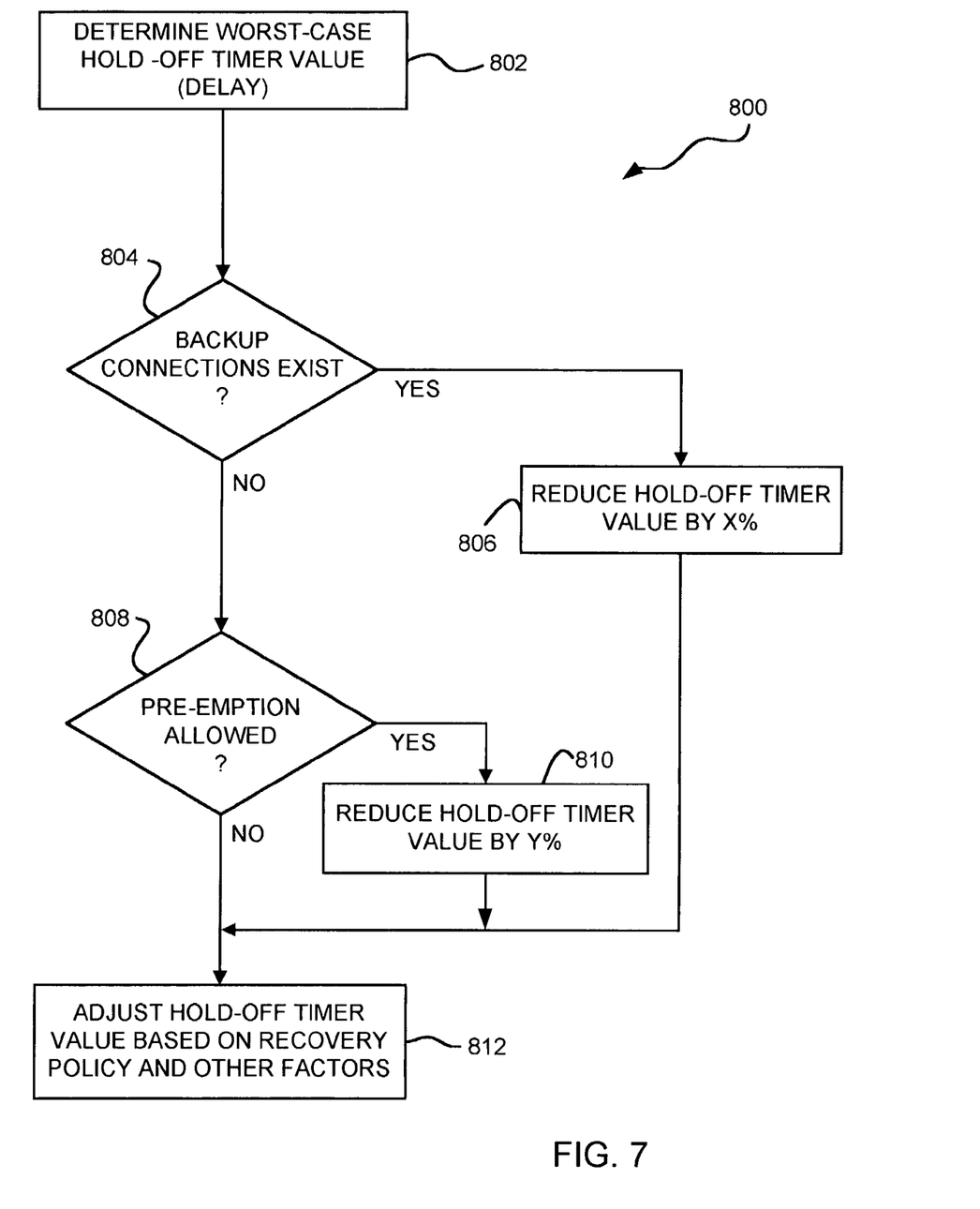
FIG. 7 illustrates a hold-off timer value determination method according to an embodiment of the present invention.

FIG. 7 illustrates a hold-off timer determination method 800 according to an embodiment of the present invention. The hold-off timer determination method 800 begins by calculating a worst-case hold-off timer value ($\Delta t$) based on network topology, node configuration or a PNNI database at step 802. For example, equation (1) described above can be used with either the worst or average values for $t_{prop}$, $t_{proc}$, and $t_{rout}$.

If backup connections exist, as determined at step 804, then the hold-off timer value ($\Delta t$) is reduced at step 806 by a predetermined percentage range (X %) to result in a lower timer value of ($\Delta t_1$)

If backup connections do not exist, as determined at step 804, but pre-emption is permitted as determined at step 808 then the hold-off timer value ($\Delta t$) is reduced by a predetermined percentage range (Y %) to result in a lower timer value of ($\Delta t_2$).

In relation to values of X % and Y %, the absolute values are not as critical as the relative values. In particular, in the above embodiment, Y should be smaller than X. Under this relative arrangement, if pre-emption is supported, lower priority connections are prevented from being setup and pre-empted later (i.e., the hold-off timer value cannot be reduced too much). If backup connections exist, release messages of lower re-route priority connections can be sent faster. The specific values of X and Y are determined based on network engineering factors known in the art.

Finally, the hold-off timer value ($\Delta t$) is adjusted based on the recovery policy and the difference of recovery requirements of successive bundles at step 812. For example, ($\Delta t$) may be reduced if the successive bundles are for large and small CBR connections with comparable QoS and relatively small size differences. In contrast, a large hold-off timer is usually needed to separate CBR and VBR connections, particularly when the network does not implement pre-configured backup connections with reserved bandwidth or if pre-emption is not permitted.

Configured Policies

Examples of various configured policies that can be utilized in the methods of the present invention (in particular in relation to steps 306, 308 and 316 of method 300—FIG. 2; and to steps 406, 408 of method 400—FIG. 3) are described below.

Configured policies are used to assign the re-routing priorities to connections in the network 10. Configured policies prioritize connections on the basis of a certain static connection feature as opposed to on the basis of dynamic network status.

Four specific configured policy examples are discussed that prioritized connections on the basis of: (1) service category, (2) connection permanence, (3) connection size and (4) application. As discussed above, based on the assigned priorities, the release messages of the same priority connections are bundled together, which can then be released in rapid succession.

As described in FIG. 4, multiple configured policies can be applied at one node. After a primary policy is applied in bundling (e.g., at step 502 of method 500), a second policy can be applied (e.g., at step 508 of method 500) to form sub-bundles. For example, if connections are first bundled on the basis of service category, and then sub-bundled on the basis of connection size, then sub-bundles of release messages are formed as follows: (a) CBR large connections; CBR small connections; VBR large connections; and VBR small connections.

Configured Policy Example

Service Category

In the service category configured policy example, connections are re-routed on the basis of service category with stringent QoS requirements being re-routed before connections with less stringent QoS requirements. The service category policy reduces the impact of link failure on the QoS performance of connections. The process of bundling the release messages under the service category policy includes the following step: bundling the connections on the basis of their QoS requirements. For example, CBR connections are bundled together, VBR connections are bundled together, and UBR connections are bundled together. At the time of re-routing, the release messages of the CBR connections will be sent first. After a prescribed period of time (defined by the hold-off timer 602), the release messages of the VBR connections will be sent and after another prescribed period of time the release messages of the UBR connections will be sent.

Configured Policy Example

Connection Permanence

In the connection permanence configured policy example, permanent connections are re-routed before switched connections. The connection permanence policy reduces the impact of link failure on the more important (i.e., higher revenue) permanent connections. Also, unlike permanent connections, switched connection users are able to obtain alternative mechanisms for re-establishing connectivity by using a different network or service provider for example.

The process of bundling the release messages under the connection permanence policy includes the following step: bundling the connections on the basis of connection type. For example, ATM PVCs are bundled together and ATM SVCs are bundled together. At the time of re-routing, the release messages of the PVCs will be sent first. After a prescribed period of time (defined by the hold-off timer 602), the release messages of the SVCs will be sent.

Configured Policy Example

Connection Size

In the connection size configured policy example, large connections are re-routed before small connections. The connection size policy reduces network bandwidth fragmentation to improve overall bandwidth utilization. In particular, large connections have a better chance of finding the required large bandwidth portions if re-routed first thereby improving the possibility of smaller connections filling the small remaining bandwidth on various links 28 in the network 10.

The process of bundling the release messages under the connection size policy includes the following step: bundling the connections on the basis of allocated bandwidth. For example, connections under 1 Mb/s are bundled together as group 1, connections allocated with 1-10 Mb/s are bundled as group 2, connections of 11-50 Mb/s are bundled as group 3, and connections larger than 50 Mb/s are bundled as group 4. At the time of re-routing, the release messages of group 4 (i.e., the largest bandwidth requirements) connections will be sent first. After a prescribed period of time (defined by the hold-off timer 602), the release messages of group 3 connections will be sent and so on.

Configured Policy Example

Application

In the application configured policy example, connections of one application type are re-routed before connections of another application type. The application policy enables the assignment of different priorities to connections of different applications. For example, mission-critical applications can be re-routed first.

The process of bundling the release messages under the application policy includes the following step: bundling the connections on the basis of the application type. For example, ATM connections are bundled together and MPLS connections are bundled together. At the time of re-routing, the release messages of ATM connections will be sent first and after a prescribed delay (defined by the hold-off timer 602) the release messages of MPLS connections will be sent.

Adaptive/Dynamic Policies

Examples of various adaptive policies that can be utilized in the methods of the present invention (in particular in relation to steps 314 and 316 of method 300—FIG. 2; and to steps 410, 412 of method 400—FIG. 3) are described below.

Adaptive policies are used to assign the re-routing priorities to connections in the network 10. Adaptive policies prioritize connections on the basis of dynamic network status.

Five adaptive policy examples are discussed that prioritized connections on the basis of: (1) bandwidth pool occupancy, (2) bandwidth pool usage, (3) active degree type 1 (with more active given priority), (4) active degree type 2 (with less active given priority), and (5) connection size.

As described in FIG. 2, an adaptive policy is used to modify/refine (step 316) the release message bundles formed by the configured policies (steps 308, 310). For example, after bundling and sub-bundling of connections using configured policies: service category and connection size (as described above), the sub-bundles of release messages are formed as follows: CBR/large connections; CBR/small connections; VBR/large connections; and VBR/small connections. Adaptive policy functionality enables a refinement of the sub-bundles on the basis of a connections' active degree. The following refined sub-bundles would be obtained after the adaptive modification: active CBR/large connections; inactive CBR/large connections; active CBR/small connections; inactive CBR/small connections; active VBR/large connections; inactive VBR/large connections; active VBR/small connections; and inactive VBR/small connections.

In describing the adaptive policy examples, the concept of bandwidth pools is used. An example of a bandwidth management model is described in applicants co-pending U.S. patent application Ser. No. 09/740,891 filed Dec. 21, 2000 titled "Resource Sharing in Multiservice Networks" and is incorporated herein by reference. The bandwidth management method described in the '891 application partitions link bandwidth into several pools. Each pool is guaranteed a minimum bandwidth allocation and there is a common pool that can be shared by all the specific pools.

Figure 8:
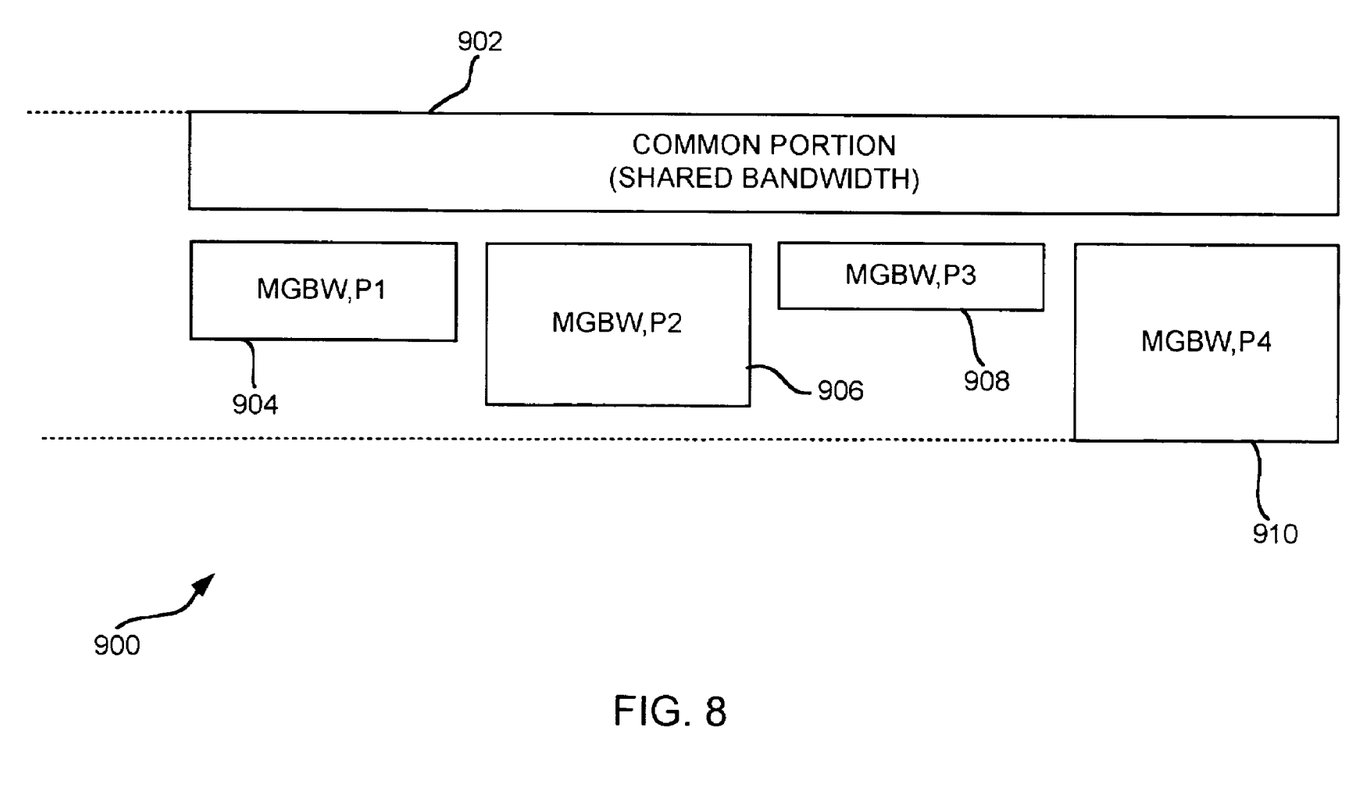
FIG. 8 illustrates an example of a bandwidth management model to illustrate various adaptive policy examples of the present invention.

FIG. 8 provides a simplified example of a model 900 to assist in describing the adaptive policy examples of the present invention. In the model 900, link capacity is used for four QoS levels as follows: the link capacity is divided into guaranteed portions for the exclusive use of each pool Pi and a common portion 902 that is shared among the various pools Pi on a first-come-first-serve basis. In particular, a minimum guaranteed bandwidth (MGBW) is configured for each pool Pi: [MGBW, P1] 904 for pool P1, [MGBW, P2] 906 for pool P2, [MGBW, P3] 908 for pool P3, and [MGBW, P4] 910 for pool P4.

Adaptive Policy Example

Bandwidth Pool Occupancy

In the bandwidth pool occupancy example, connections occupying the minimum guaranteed bandwidth pools (904, 906, 908, or 910) are re-routed before connections occupying the common portion 902. The bandwidth pool occupancy adaptive policy guarantees the minimum bandwidth required for each class/pool. For example, when one pool (e.g., P1) is allocated for signaling traffic and another pool (e.g., P2) for user data such as voice or mission-critical data it is important that both pools P1 and P2 satisfy the respective minimum guarantees (904 for P1 and 906 for P2) to ensure network utility.

The process of bundling the release messages under the bandwidth pool occupancy adaptive policy includes the following step: bundling the connections on the basis of bandwidth pool. For example, connections allocated with the minimum guaranteed pools (P1-P4) are bundled together as group 1; connections allocated with the shared bandwidth pool 902 are bundled together as group 2. At the time of re-routing, the release messages of group one connections' are sent first and after a prescribed delay (hold-off timer 602) the release messages of group two are sent.

Adaptive Policy Example

Bandwidth Pool Usage

In situations where the link bandwidth is shared by several departments, corporations or applications with each such entity being allocated with one pool (e.g., corporation A allocated to pool 904, corporation B allocated to pool 906, etc.) the bandwidth pool usage adaptive policy of the present invention can be used. At link failure, recovery or reduction of bandwidth from each pool is uniform. For example, a 10% reduction in bandwidth is applied to each pool P1-P4. In particular, connections within a certain percentage of bandwidth pool usage are re-routed before re-routing connections outside the percentage. A bandwidth pool usage value is defined as a ratio of the allocated bandwidth and the bandwidth pool size. The bandwidth pool usage adaptive policy enables an equalization of the bandwidth usage among different customers or applications.

The process of bundling the release messages under the bandwidth pool usage adaptive policy includes the following step: bundling the connections on the basis of pool usage. For example, three corporations share the link bandwidth, with each allocated with equal pool size. The connections of pool 1 consume 90% of the pool capacity, the connections of pool 2 consume 40% of the pool capacity; and the connections of pool 3 consume 10% of the pool capacity. If 50% recovery of bandwidth is required/desired, then all connections in pool 2 and pool 3 and the connections that use 50% of the bandwidth in pool 1 are bundled together as group 1. The remaining connections in pool 1 are bundled together as group 2. At the time of re-routing, the release messages of group 1 are sent first and after a prescribed delay (hold-off timer 602) the release messages of group 2 connection are sent.

Variations of the bandwidth pool usage adaptive policy include: (a) penalize the excessive bandwidth user (i.e., pool 1) with the goal of having all pools, after recovery, maintain the same percentage of the pool's maximum configured size; and (b) spread out the recovery reduction across all bandwidth pools by assigning, say 50%, of each pool to the highest-priority bundle (i.e., group 1). This would result in the present example in assigning 45% of Pool 1, 20% of Pool 2, and 5% of Pool 3 to the first priority bundle.

Adaptive Policy Example

Active Degree-Types 1 and 2

In the active degree type 1 example, more active connections are re-routed before re-routing less active connections. The active degree of a connection can be estimated as a ratio of measured load and allocated bandwidth. Using the active degree type 1 adaptive policy provides more active connections with a better chance of getting re-routed and provides better network QoS.

The process of bundling the release messages under the active degree type 1 adaptive policy includes the following step: bundling the release messages on the basis of the active degree of connections. For example, connections with an active degree less than 0.3 are bundled together as group 1, connections with an active degree of between 0.3 and 0.7 are bundled together as group 2 and connections with an active degree greater than 0.7 are bundled together as group 3. At the time of re-routing, release messages of group 3 are sent first and after a prescribed delay (hold-off timer 602) the release messages of group 2 will be sent and after a further prescribed delay the release messages of group 1 will be sent.

In the active degree type 2 example, less active connections are re-routed before re-routing more active connections. Using the active degree type 2 adaptive policy provides less active connections with a better chance of getting re-routed, which can help in maximizing revenue when measurement-based admission control is conducted in the network.

The process of bundling the release messages under the active degree type 2 adaptive policy includes the following step: bundling the release messages on the basis of the active degree of connections (identical to type 1 adaptive policy described above). For example, connections with an active degree less than 0.3 are bundled together as group 1, connections with an active degree of between 0.3 and 0.7 are bundled together as group 2 and connections with an active degree greater than 0.7 are bundled together as group 3. At the time of re-routing, release messages of group 1 are sent first and after a prescribed delay (hold-off timer 602) the release messages of group 2 will be sent and after a further prescribed delay the release messages of group 3 will be sent.

Adaptive Policy Example

Connection Size

In the connection size example, large connections are re-routed before small connections. Using the connection size adaptive policy avoids network bandwidth fragmentation, which improves overall bandwidth utilization. In particular, large connections will have a better chance to find the required large bandwidth portions if re-routed first with smaller connections filling the remaining bandwidth on various links.

The process of bundling the release messages under the connection size adaptive policy includes the following step: bundling the release messages on the basis of allocated bandwidth. The connection size adaptive policy is similar to the connection size configured policy described above when the connection size to priority mapping was configured. The same policy can be applied adaptively in this example by dividing the actual connections on the link to four equal size bundles based on connection size. For example, if 100 connections are using the failed link, the largest 25 connections may be assigned to bundle 1 and the next 25 largest connections may be assigned to bundle 2 etc. Alternatively, the connection size adaptive policy can divide the bandwidth between the largest and smallest connections into four equal size ranges and group connections within each range into one bundle.

The embodiments and examples of the present invention can be implemented in conventional computer programming languages (i.e., procedural programming languages and object oriented languages). Further, embodiments and examples of the present invention can be implemented as pre-programmed hardware elements, other related components, or a combination of hardware and software components.

Embodiments and examples can also be implemented as a computer program product for use with a computer system. Such an implementation may include a series of computer instructions fixed either on a tangible medium, such as a computer readable medium (e.g., diskette, CD-ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared, etc.).

The series of computer instructions (termed a code segment) embodies all or part of the functionality previously described herein. Those skilled in the art will understand that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation, pre-loaded with a computer system (e.g., on system ROM or fixed disk), or distributed from a server over the network 10 (e.g., the Internet). Also, embodiments and examples of the present invention may be implemented as a combination of both software (e.g., a computer program product) and hardware (termed mechanisms or modules).

In summary, the exemplary embodiments of the present invention provide benefits:

(a) in networks where re-route connections are computed after link failure and bandwidth pre-emption is not allowed, the methods of the present invention improves network performance and efficiency in terms of guaranteeing preferential resource access and better routes for the higher priority connections;

(b) in networks where re-route connections are computed after link failure and bandwidth pre-emption is allowed, the methods of the present invention improves call processing efficiency and can increase recovery speed of the higher priority connections. In an exemplary embodiment of the present invention this is achieved by preventing the quick setup of lower priority connections and the ultimate subsequent pre-emption by higher priority connections; and (c) in networks where backup connections are pre-computed and resources allocated before link failure (i.e., setup at the same time as the main connection are created), the methods of the present invention improves the recovery speed of higher priority connections.

The invention claimed is:

1. A method for use in a connection-oriented network comprising a plurality of nodes interconnected by a plurality of links for establishing connections within the network, the method enabling the recovery of connections in the network in the event of a failure therein, the method comprising:

(a) assigning connection re-routing priority to the connections in the network based on configured polices in response to the failure;

(b) creating release message bundles based on the assigned connection re-routing priority for use by the nodes in the network to recover connections which includes:

(b1) creating a plurality of bundles of release messages of recovery requirements based on priority with reference to the re-routing in the network, the created bundles of release messages being in bundling order, the bundling ordered release messages being sent to nodes of the network; and (c) if step (b1) is performed in a node which is neither a call originated nor a call destined node, sending a prescribed bundle of release messages to the plurality of nodes in the network which includes:

(c1) sending a first bundle of the bundling ordered release messages; and in a case of another bundle being required to be sent, sending another bundle of the bundles of release messages after a predetermined hold-off timer value, wherein an initial value of the predetermined hold-off timer is determined from:

$\max\{(t_{prop,i})+(t_{proc,i})+(t_{rout,i})$ for all connections $1<i<N$ in a group, where $(t_{prop,i})$ represents propagation delay between a current node and a source node of a connection "i", $(t_{proc,i})$ represents processing time of the release message at the source node of the connection "i": $(t_{rout,i})$ represents re-routing time at the source node of connection "i"; and N is the number of connections, the current node being a node in the network detecting the failure and sending release messages to nodes of affected connections and the source node being an originating edge node of the connection.

2. The method of claim 1, wherein step (a) includes:

in a case of no connection re-routing priority being signaled by the network, assigning connection re-routing priority to the connections based on the configured policies, the assigned connection re-routing priority being used for creating the release message bundles.

3. The method of claim 2, wherein the assigned connection re-routing priority is based on at least one of service category, connection permanence, connection size and application type with reference to re-routing in the network.

4. The method of claim 2, wherein step (a) includes:

applying policy from a plurality of re-routing policies required for re-routing connections in the network, the applied policy being used for creating the release message bundles.

5. The method of claim 4, wherein the step of applying policy includes:

selecting a primary re-routing policy from the plurality of policies, wherein boundaries and ordering of the created release message bundles are not adjusted; and selecting another re-routing policy from the plurality of polices, in a case of another re-routing policy being necessary, wherein bundle boundaries and ordering of the created release message bundles are adjusted.

6. The method of claim 2, further including:

in a case where the assigned connection re-routing priority is to be adjusted, adjusting the assigned connection re-routing priority based on a dynamic state of the network and adaptive policies, the adaptive policies comprising at least one of bandwidth pool occupancy, bandwidth pool usage, more active connections given priority, less active connections given priority and connection size with reference to the re-routing in the network; and adjusting the created release message bundles.

7. The method of claim 6, wherein the step of adjusting the assigned connection re-routing priority includes:
applying policy from a plurality of re-routing policies required for re-routing connections in the network.

8. The method of claim 7, wherein the step of applying policy includes:
selecting a primary re-routing policy from the plurality of policies, wherein boundaries and ordering of the created release message bundles are not adjusted; and
selecting another re-routing policy from the plurality of polices, in a case of another re-routing policy being necessary, wherein bundle boundaries and ordering of the created release message bundles are adjusted.

9. The method of claim 6, wherein the step of adjusting the assigned connection re-routing priority includes:
determining whether the adaptive policies are used in deciding re-routing priority from a nodal configuration of the network.

10. The method of claim 6, further comprising:
after the step of creating release message bundles based on the assigned connection re-routing priority, storing the created release message bundles in a storage mechanism and wherein the step of adjusting the created release message bundles includes updating the created release message bundles stored in the storage mechanism.

11. The method of claim 6, wherein the step of creating release message bundles based on the assigned connection re-routing priority is performed, after the step of adjusting the assigned connection re-routing priority.

12. The method of claim 11, further comprising:
adjusting the created release message bundles; and
storing the adjusted release message bundles in a storage mechanism.

13. The method of claim 1, wherein the failure includes one or more of a link failure, a line card port failure within one of the plurality of nodes, a line card processor failure within one of the plurality of nodes, and a firmware failure within one of the plurality of nodes.

14. The method of claim 1, further comprising:
in a case of connection re-routing priority being signaled by the network, modifying the signaled connection re-routing priority based on the configured policies, wherein step (b) creates release message bundles based on the modified connection re-routing priority for provisioning to nodes in the network.

15. The method of claim 14, wherein the step of modifying the signaled connection re-routing priority based on the configured policies includes:
modifying the priority based on at least one of service category, connection permanence, connection size and application type with reference to re-routing in the network.

16. The method of claim 14, wherein the step of modifying the signaled connection re-routing priority based on the configured policies includes:
applying policy from a plurality of re-routing policies required for re-routing connections in the network, the applied policy being used for creating the release message bundles.

17. The method of claim 16, wherein the step of applying policy includes:
selecting a primary re-routing policy from the plurality of policies, wherein boundaries and ordering of the created release message bundles are not adjusted; and
selecting another re-routing policy from the plurality of polices, in a case of another re-routing policy being necessary, wherein bundle boundaries and ordering of the created release message bundles are adjusted.

18. The method of claim 7, further comprising:
in a case where the modified connection re-routing priority is required to be adjusted, adjusting the modified connection re-routing priority based on a dynamic state of the network and adaptive policies, the adaptive policies comprising at least one of bandwidth pool occupancy, bandwidth pool usage, more active connections given priority, less active connections given priority and connection size with reference to the re-routing in the network; and
adjusting the created release message bundles.

19. The method of claim 18, wherein the step of adjusting the modified connection re-routing priority includes:
determining whether the adaptive policies are used in deciding re-routing priority from a nodal configuration of the network.

20. The method of claim 18, further comprising:
after the step of creating release message bundles based on the modified connection re-routing priority, storing the created release message bundles in a storage mechanism and wherein the step of adjusting the created release message bundles includes updating the created release message bundles stored in the storage mechanism.

21. The method of claim 18, wherein the step of creating release message bundles based on the modified connection re-routing priority is performed, after the step of adjusting the modified connection re-routing priority.

22. The method of claim 21, further comprising:
adjusting the created release message bundles; and
storing the adjusted release message bundles in a storage mechanism.

23. The method of claim 1, further comprising the step of:
in a case of the step of creating a plurality of bundles of release messages being performed in a call originated node or a call destined node, sending the bundles of release messages to other nodes in the network.

24. The method of claim 23, wherein the step of sending the bundles of release messages includes:
sending release messages of further divided bundles, the further divided bundles being bundling ordered release messages of sub-divided bundles.

25. The method of claim 1, wherein the step of sending another bundle includes:
sending release messages of an individual one of the bundles upon expiration of time set for that individual bundle, after completion of sending release messages of a preceding one of the bundles, the time being set separately to the individual bundles.

26. The method of claim 1, wherein the step of sending the prescribed bundle of release messages includes:
sending release message of further divided bundles of the prescribed bundle, the further divided bundles being bundling ordered release messages of sub-divided bundles, each sub-divided bundle being sent with predetermined hold-off time required for that sub-divided bundle.

27. The method of claim 1, wherein the initial value of the predetermined hold-off timer is reduced by a first prescribed amount when backup connections exist between the first and second node of the network.

28. The method of claim 27, wherein the initial value of the predetermined hold-off timer is reduced by a second prescribed amount when pre-emption is permitted between the first and second node of the network.

29. The method of claim 28, wherein the first prescribed amount is larger than the second prescribed amount.

30. An apparatus for use in a connection-oriented network comprising a plurality of nodes interconnected by a plurality of links for establishing connections within the network, the method enabling recovery of connections in the network in the event of a failure therein, the apparatus comprising:
(a) a mechanism configured and adapted to assign connection re-routing priority to the connections in the network based on configured polices in response to the failure;
(b) a mechanism configured and adapted to create release message bundles based on the assigned connection re-routing priority for use by the nodes in the network for recovering connections which includes:
(b1) a mechanism configured and adapted to create a plurality of bundles of release messages of recovery requirements based on priority with reference to the re-routing in the network, the created bundles of release messages being in a bundling order, the bundling ordered release messages being sent to nodes of the network; and
(c) if the (b1) mechanism is situated in a node which is neither a call originated nor a call destined node, the apparatus comprises a further mechanism for sending a prescribed bundle of release messages to the plurality of nodes in the network, the further mechanism including;
(c1) a mechanism configured and adapted to send a first bundle of the bundling ordered release messages and, in a case of another bundle being required to be sent, sending another bundle of the bundles of release messages after a predetermined hold-off timer value, wherein an initial value of the predetermined hold-off timer is determined from:
$\max\{(t_{prop,i})+(t_{proc,i})+(t_{rout,i})$ for all connections $1<i<N$ in a group, where $(t_{prop,i})$ represents propagation delay between a current node and a source node of a connection "i", $(t_{proc,i})$ represents processing time of the release message at the source node of the connection "i"; $(t_{rout,i})$ represents re-routing time at the source node of connection "i"; and N is the number of connections the current node being a node in the network detecting the failure and sending release messages to nodes of affected connections and the source node being an originating edge node of the connection.

31. The apparatus of claim 30, wherein the mechanism (a) includes:
(a1) a mechanism configured and adapted to apply policy from a plurality of re-routing policies required for re-routing connections in the network, the applied policy being used for creating the release message bundles.

32. The apparatus of claim 31, wherein the mechanism (a1) includes:
(a11) a mechanism configured and adapted to select a primary re-routing policy from the plurality of policies, wherein boundaries and ordering of the created release message bundles are not adjusted; and
(a12) a mechanism configured and adapted to select another re-routing policy from the plurality of polices, in a case of another re-routing policy being necessary, wherein bundle boundaries and ordering of the created release message bundles are adjusted.

33. The apparatus of claim 31, further including:
(d) a mechanism configured and adapted to adjust the assigned connection re-routing priority based on a dynamic state of the network and adaptive policies, the adaptive policies comprising at least one of bandwidth pool occupancy, bandwidth pool usage, more active connections given priority, less active connections given priority and connection size with reference to the re-routing in the network; and to adjust the created release message bundles.

34. A computer program product for use in a connection-oriented network comprising a plurality of nodes interconnected by a plurality of links for establishing connections within the network to enable recovery of connections in the network in the event of a failure therein, the computer program product comprising computer readable medium encoded with computer program code for:
(a) assigning connection re-routing priority to the connections in the network based on configured polices in response to the failure;
(b) creating release message bundles based on the assigned connection re-routing priority for use by the nodes in the network to recover connections which includes:
(b1) creating a plurality of bundles of release messages of recovery requirements based on priority with reference to the re-routing in the network, the created bundles of release messages being in a bundling order, the bundling ordered release messages being sent to nodes of the network; and
(c) if step (b1) is performed in a node which is neither a call originated nor a call destined node, sending a prescribed bundle of release messages to the plurality of nodes in the network which includes:
(c1) sending a first bundle of the bundling ordered release messages; and in a case of another bundle being required to be sent, sending another bundle of the bundles of release messages after a predetermined hold-off timer value, wherein an initial value of the predetermined hold-off timer is determined from:
$\max\{(t_{prop,i})+(t_{proc,i})+(t_{rout,i})$ for all connections $1<i<N$ in a group, where $(t_{prop,i})$ represents propagation delay between a current node and a source node of a connection "i", $(t_{rout,i})$ represents processing time of the release message at the source node of the connection "i": $(t_{rout,i})$ represents re-routing time at the source node of connection "i"; and N is the number of connections, the current node being a node in the network detecting the failure and sending release messages to nodes of affected connections and the source node being an originating edge node of the connection.

35. The computer program product of claim 34, wherein the computer readable program code devices for assigning connection re-routing priority includes:
applying policy from a plurality of re-routing policies required for re-routing connections in the network, the applied policy being used for creating the release message bundles.

36. The computer program product of claim 35, wherein the computer readable program code devices for applying policy includes:
selecting a primary re-routing policy from the plurality of policies, wherein boundaries and ordering of the created release message bundles are not adjusted; and selecting another re-routing policy from the plurality of polices, in a case of another re-routing policy being necessary, wherein bundle boundaries and ordering of the created release message bundles are adjusted.

37. The computer program product of claim 35, further including:

adjusting the assigned connection re-routing priority based on a dynamic state of the network and adaptive policies, the adaptive policies comprising at least one of bandwidth pool occupancy, bandwidth pool usage, more active connections given priority, less active connections given priority and connection size with reference to the re-routing in the network; and adjusting the created release message bundles.

* * * * *